United States Patent
Lima

(10) Patent No.: US 10,329,772 B1
(45) Date of Patent: Jun. 25, 2019

(54) SELF-ADHESIVE COATING FOR MASONRY

(71) Applicant: PERTECH DO BRASIL LTDA., Sao Paulo (BR)

(72) Inventor: Carlos Alfredo Lima, Sao Paulo (BR)

(73) Assignee: PERTECH DO BRASIL LTDA, Sao Paulo (BR)

(*) Notice: Subject to any disclaimer, the term of this patent is extended or adjusted under 35 U.S.C. 154(b) by 0 days.

(21) Appl. No.: 15/932,246

(22) Filed: Feb. 16, 2018

(51) Int. Cl.
| | |
|---|---|
| *E04F 13/00* | (2006.01) |
| *B32B 7/12* | (2006.01) |
| *B32B 27/30* | (2006.01) |
| *B32B 7/06* | (2019.01) |
| *B32B 27/10* | (2006.01) |
| *B32B 27/42* | (2006.01) |

(52) U.S. Cl.
CPC .......... *E04F 13/002* (2013.01); *B32B 7/06* (2013.01); *B32B 7/12* (2013.01); *B32B 27/10* (2013.01); *B32B 27/306* (2013.01); *B32B 27/42* (2013.01); *B32B 2260/028* (2013.01); *B32B 2260/046* (2013.01); *B32B 2451/00* (2013.01); *B32B 2607/02* (2013.01)

(58) Field of Classification Search
CPC . E04F 13/002; B32B 7/06; B32B 7/12; B32B 27/10; B32B 27/306; B32B 27/42; B32B 2260/028; B32B 2260/046; B32B 2451/00; B32B 2607/02; Y10T 428/14
See application file for complete search history.

(56) References Cited

U.S. PATENT DOCUMENTS

| | | | | |
|---|---|---|---|---|
| 3,049,458 A | * | 8/1962 | Willard | B32B 27/00 156/278 |
| 3,616,021 A | * | 10/1971 | Valerius | B32B 27/00 156/228 |
| 3,660,201 A | * | 5/1972 | Senior | B44C 5/0469 156/307.4 |
| 3,701,711 A | * | 10/1972 | Kelly | B32B 15/08 428/215 |
| 3,736,220 A | * | 5/1973 | Manubahi | D21H 27/28 428/327 |
| 3,814,647 A | * | 6/1974 | McQuade | B44C 3/085 156/219 |
| 3,887,743 A | * | 6/1975 | Lane | B44C 1/10 428/206 |
| 3,975,572 A | * | 8/1976 | Power | B32B 29/00 428/452 |
| 4,636,443 A | * | 1/1987 | Jaisle | B32B 29/06 428/481 |
| 5,425,986 A | * | 6/1995 | Guyette | A47B 96/206 428/141 |
| 6,375,788 B1 | * | 4/2002 | Ma | B32B 29/00 156/307.4 |
| 2004/0091694 A1 | * | 5/2004 | Holzer | B29C 35/0272 428/323 |
| 2011/0076489 A1 | * | 3/2011 | Nonaka | C09J 7/29 428/337 |
| 2013/0295346 A1 | * | 11/2013 | Ferguson | E04C 2/26 428/196 |

* cited by examiner

*Primary Examiner* — Patricia L. Nordmeyer
(74) *Attorney, Agent, or Firm* — Umberg Zipser LLP

(57) ABSTRACT

A "SELF-ADHESIVE COATING FOR MASONRY" characterized in that it comprises a decorative high-pressure laminated sheet having a thickness between 0.6 mm and 0.8 mm combined with an EVA (Ethyl Vinyl Acetate) cover having a thickness between 0.8 mm and 1.0 mm, resulting in a product having a final thickness between 1.4 mm and 1.8 mm.

5 Claims, No Drawings

SELF-ADHESIVE COATING FOR MASONRY

FIELD OF THE INVENTION

The present specification refers to a self-adhesive coating for masonry and, more specifically, to a coating in the form of decorative high-pressure laminated sheets combined with an EVA (Ethyl Vinyl Acetate) cover, resulting in a product with a final thickness of about 1.8 mm.

BACKGROUND

As is known to those skilled in the art, techniques for decorative finishing of masonry walls other than painting are known, and these techniques are faster and more efficient in their applications. One of these techniques consists of the application of special papers, made of 100% cellulose, vinyl paint and a PVC layer, which are applied and pressed close to the surface of the masonry after receiving a layer of special glue in their surface of contact with said masonry. These wallpapers, although widely used, have drawbacks in terms of durability, since they exhibit very low resistance to abrasion and their applicability requires as well a preliminary preparation of the surface (wall to receive the coating); let alone the various steps comprised in its application.

Another more advanced technique that has come to revolutionize and diversify finishes by coating masonry surfaces is the decorative coating consisting of self-adhesive pieces that can be applied directly to the surface. Since they allow numerous print options, these products are indicated to give a special touch to the wall where there is coating. Among the options for self-adhesive coating, one consists of a 100% cellulose film (paper), another one of a paper composition with vinyl paint and a PVC layer, all layers being calendered which, such as the wallpaper, exhibits a low resistance to abrasion and yet its applicability requires a preliminary preparation of the surface (wall to receive the coating), although it admits its direct application by self adhesion even in curved surfaces.

Although the conventionally-known decorative coatings are used satisfactorily, both those requiring special glue and the self-adhesive ones, they have some drawbacks related to their structural design, referring to their durability and mechanical resistance and also referring to the limitations of applicability, since they are only allowed on previously treated surfaces and maintained under certain cleaning and texture conditions.

Such known coatings do not allow their application to any type of surface, which limits their use as a coating product for any type of surface.

Another drawback relates to the fact that under certain texture and placement conditions of the decorated coating and of the wall receiving the application, if the latter exhibits a strong color or a certain type of paint, these factors will interfere with the coating if the surface does not is treated, allowing non-adhesion of the coating and/or interference of the base color of the surface in the pattern and/or decorative color defined in the coating.

SUMMARY OF THE INVENTION

It is an object of the present invention to provide a self-adhesive coating for masonry which can be applied to any type of surface and allows its use in large areas in a single application, thereby reducing time and facilitating the execution of coating work for large surfaces.

Another object of the present invention is to provide a self-adhesive coating for masonry which has a higher mechanical strength, a high resistance to abrasion and which can be applied directly to any type of surface without any preliminary preparation of the latter, which reduces the time of application and makes easier the application of coating to a masonry, be it a painted wall or a plastered wall, or a dry-wall or cement surface.

DETAILED DESCRIPTION OF THE INVENTION

These and other objects and advantages of the present invention are achieved with a self-adhesive masonry coating comprising a decorative high-pressure laminated sheet having a thickness of 0.8 mm coupled with an EVA (Ethyl Vinyl Acetate) cover having a thickness of 1.0 mm, resulting in a product with a final thickness of 1.8 mm, said sheet being produced in sizes of 1.25×3.08 m and 1.25×2.51 m.

This self-adhesive coating for masonry is applicable to masonry walls that are already impermeable, of the dry-wall type, cementitious boards, wooden walls and partitions; if they are not waterproofed, an acrylic sealant must be applied thereon (white or similar) to waterproof the wall.

The self-adhesive high-pressure laminate sheet is comprised of a set of decorative papers impregnated with melamine resin, combined with kraft papers impregnated with phenolic resins, the set being high-pressed (80 to 100 kg/cm$^2$) at high temperature (135° C. to 145° C.). After this pressing step, this laminate has its back sanded to maintain a uniform surface and facilitate the adhesion of an EVA (Ethyl Vinyl Acetate) cover with double face adhesive, which is defined by a high-tack acrylic adhesive applied in both the sides of the EVA cover. For the protection of the back of the high-pressure laminate provided with the adhesive, a super-calendered paper of 80 g/m$^2$ is applied and, upon application, it will protect said adhesive film until the final application of the laminate coating, when this protective paper is removed.

The final result is a completely homogeneous and high strength product.

Below is an example of a table with the specifications of the acrylic adhesive:

| Proprieties | Unit | Specification |
| --- | --- | --- |
| Total Weight (Adhesive) | g/m$^2$ | 100 +/− 5 |
| Total Thickness | mm | 1.00 +/− 0.02 |
| Coil Width | mm | 1.300 +/− 20 |
| Paper Width (Liner) | mm | 1300 +/− 20 |
| Acrylic adhesive on each side | g/m$^2$ | 50-60 |
| Max. Inner diameter | mm | 75.00 |
| Max. Outer diameter | mm | 300 +/− 10 |

Below is the technical information on EVA (Ethyl Vinyl Acetate), where:
Product: EVA—Ethylene-Vinyl Acetate Copolymers
Product Identification:
PRODUCT NAME: Ethylene-Vinyl Acetate Copolymer
OTHERS/GENERIC NAME: EVA
PRODUCT USE: multiple uses in many applications
Composition/Information on Ingredients
INGREDIENTS NAME CAS Number Weight
Ethylene-Vinyl Acetate 24937-78-8~100
Vinyl Acetate 108-05-4 Trace Below is the technical information on High Pressure Laminate:

| | | | |
|---|---|---|---|
| Nominal Thickness (mm) | | | 0.8 |
| Thickness Tolerance (mm) | | | 0.65 to 0.90 |
| Wear resistance (cycles) (*) | | ISO-4586-1 and 2 | ≥350 |
| Resistance to risk (N) (**) | | ISO-4586-1 and 2 | ≥2.0 |
| Immersion in boiling water 2 h - Water absorption (%) | | ISO-4586-1 and 2 | ≤12 |
| Immersion in boiling water 2 h - Thickness increase (%) | | ISO-4586-1 and 2 | ≤14 |
| Immersion in boiling water 2 h - Appearance (color/brightness change visible through certain angles and free of delamination | | ISO-4586-1 and 2 | ≥4 |
| Resistance to high temperature 180° C./20 min (bubble free and delamination/loss of brightness for bright finish) | | ISO-4586-1 and 2 | ≥3 |
| Resistance to vapor 1 h (color/brightness change visible through certain angles and free of delamination and bubbles) | | ISO-4586-1 and 2 | ≥4 |
| Stain Resistance (***) | Groups 1 and 2 (no change after 16 hours) | ISO-4586-1 and 2 | ≥5 |
| | Groups 3 and 4 (small change in brightness and color after 10 min) | ISO-4586-1 and 2 | ≥4 |
| Dimensional stability (%) | — | ISO-4586-1 and 2 | ≤0.65 |
| | T | ISO-4586-1 and 2 | ≤1.10 |

(*) Wear resistance refers to the pattern and not to the finish.
(**) Scratch resistance varies with the finish and color of the laminate. Brightly finished laminates and dark colors have less resistance to scratching.
(***) Examples of the products of groups 1 and 2 = toothpaste, coffee, tea, alcoholic beverages, mustard, vinegar, soft drinks, lipstick, pen ink. Examples of products in groups 3 and 4 = shoe grease, bleach, chrome mercury, hair dye, iodine.

While a preferred constructive design has been described and illustrated, it is to be noted that the self-adhesive coating for masonry defined by a self-adhesive sheet may exhibit constructive variants of thickness, perimeter dimensions and shapes, as well as texture, without departing from the scope of the present invention.

The invention claimed is:

1. A self-adhesive laminate for masonry, comprising: a decorative high-pressure laminated sheet having a thickness between 0.6 mm and 0.8 mm combined with an EVA (Ethyl Vinyl Acetate) cover having a thickness between 0.8 mm and 1.0 mm, resulting in a product having a final thickness between 1.4 mm and 1.8 mm, wherein the EVA cover has first and second surfaces disposed on opposite sides of the EVA cover, wherein the first surface faces the laminated sheet, and the second surface comprises a first adhesive.

2. The self-adhesive laminate for masonry according to claim 1, wherein the decorative high-pressure laminated sheet has a thickness of 0.8 mm combined with an EVA (Ethyl Vinyl Acetate) cover having a thickness of 1.0 mm, resulting in a product having a thickness of 1.8 mm, said sheet being produced in dimensions of 1.25 m×3.08 m and 1.25 m×2.51 m.

3. The self-adhesive laminate for masonry according to claim 1, wherein the decorative high-pressure laminated sheet comprises a set of decorative papers impregnated with melamine resin, combined with kraft papers impregnated with phenolic resins, this set being high-pressed (80 to 100 kg/cm$^2$) at high temperature (135° C. to 145° C.); wherein after pressed, this laminate has its back sanded to receive by adhesion the EVA (Ethyl Vinyl Acetate) cover with double sided adhesive.

4. The self-adhesive laminate for masonry according to claim 3, wherein the EVA (Ethyl Vinyl Acetate) cover comprises a second adhesive disposed on the first surface, and wherein the second adhesive couples the EVA cover to the laminated sheet, wherein the first and second adhesive comprises a high-tack acrylic adhesive, wherein the first adhesive is protected by a super-calendered paper of 80 g/m$^2$ which, when applied, will protect the first adhesive until the final application of the laminate coating, when that protective paper is removed from the first adhesive.

5. The self-adhesive laminate for masonry according to claim 3, wherein the laminate and first adhesive is configured to be applied to any dry-wall masonry wall, cementitious boards, wooden walls and/or partitions, and wherein when applied, the laminate defines a homogeneous surface, of high mechanical strength and uniformity.

* * * * *